United States Patent
Martin

(10) Patent No.: US 8,915,686 B2
(45) Date of Patent: Dec. 23, 2014

(54) UNITARY, STRIKE, DROP-IN ANCHOR FOR CONCRETE AND THE LIKE

(71) Applicant: Stephen S. Martin, Huntington Station, NY (US)

(72) Inventor: Stephen S. Martin, Huntington Station, NY (US)

(73) Assignee: Duro Dyne Corporation, Bay Shore, NY (US)

( * ) Notice: Subject to any disclaimer, the term of this patent is extended or adjusted under 35 U.S.C. 154(b) by 33 days.

(21) Appl. No.: 13/895,966

(22) Filed: May 16, 2013

(65) Prior Publication Data
US 2013/0309039 A1  Nov. 21, 2013

Related U.S. Application Data

(60) Provisional application No. 61/648,919, filed on May 18, 2012.

(51) Int. Cl.
  *F16B 19/00* (2006.01)
  *E04B 1/41* (2006.01)
  *F16B 19/10* (2006.01)

(52) U.S. Cl.
  CPC .............. *E04B 1/415* (2013.01); *F16B 19/1081* (2013.01); *Y10S 411/999* (2013.01)
  USPC .............................................. 411/45; 411/999

(58) Field of Classification Search
  USPC ............. 411/44, 45, 57.1, 348, 356, 357, 999
  See application file for complete search history.

(56) References Cited

U.S. PATENT DOCUMENTS

| | | | | | |
|---|---|---|---|---|---|
| 1,104,544 | A | * | 7/1914 | Raeger | 411/57.1 |
| 1,202,159 | A | * | 10/1916 | Camden | 411/57.1 |
| 3,390,712 | A | * | 7/1968 | McKay | 411/265 |
| 3,650,173 | A | * | 3/1972 | Mathe | 411/45 |
| 5,746,556 | A | * | 5/1998 | Sato | 411/42 |
| 5,913,792 | A | | 6/1999 | Fischer | |
| 5,979,913 | A | | 11/1999 | Kosik et al. | |
| 7,752,944 | B2 | * | 7/2010 | Wallek | 81/27 |
| 7,814,631 | B2 | | 10/2010 | Wallek | |
| 8,434,980 | B2 | * | 5/2013 | Hsu | 411/45 |

(Continued)

*Primary Examiner* — Flemming Saether
(74) *Attorney, Agent, or Firm* — Barry G. Magidoff; Paul J. Sutton

(57) ABSTRACT

There is provided a unitary, strike drop-in anchor where the individual parts are permanently held together to avoid misplacing any such individual part. The anchor comprises an anchor body with a central bore, the first end of the bore being threaded and having a constant internal cross-section for the length of the threaded portion. The exterior of the anchor body, and the central bore, having a decreasing bore towards the second end of the anchor body beyond the threaded portion, a threaded bolt with an internal central bore and a preferably polygonal drive head, and external threads extending from the drive head to the second end, has a strike tool extending through the central bore from the second end and extending beyond the drive head. The strike tool has a strike head that has a diameter larger than the central bore of the threaded bolt and is adjacent the second end of the threaded bolt; a wedge slug is wedged within the central bore of the anchor body, adjacent the decreasing bore portion and is held in place within the anchor body by the threaded bolt and the strike head. When the anchor is assembled, and the anchor is placed within a hole drilled into concrete, striking the outer end of the strike tool with a hammer, causes the wedge slug to flare the narrower inner end of the anchor body, locking the anchor into the concrete.

6 Claims, 4 Drawing Sheets

(56) References Cited

U.S. PATENT DOCUMENTS

| | | |
|---|---|---|
| 2003/0198529 A1 | 10/2003 | Warmolts et al. |
| 2009/0214315 A1 | 8/2009 | Kelly et al. |
| 2010/0003101 A1 | 1/2010 | Ricketts |
| 2012/0017421 A1 | 1/2012 | Bland et al. |

* cited by examiner

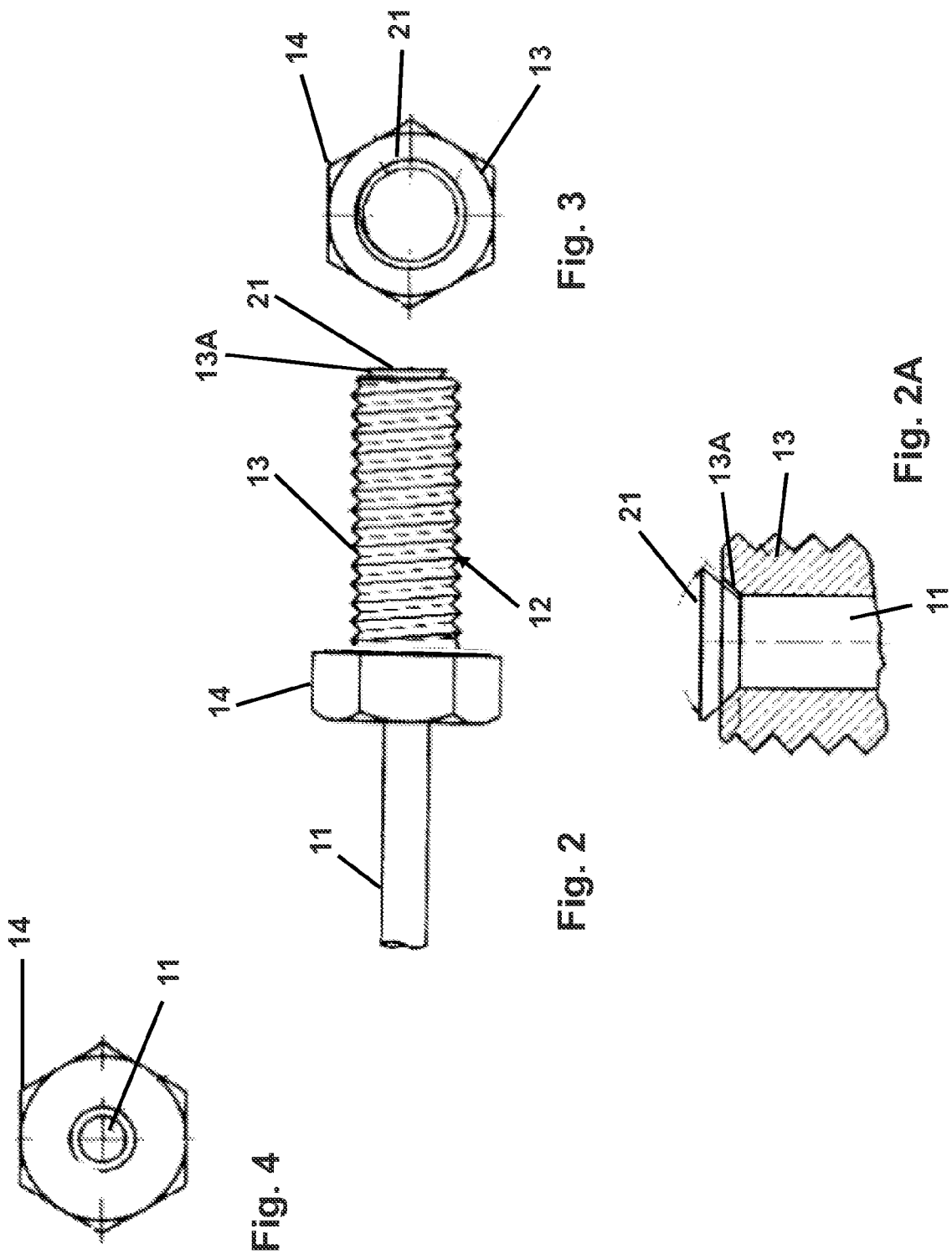

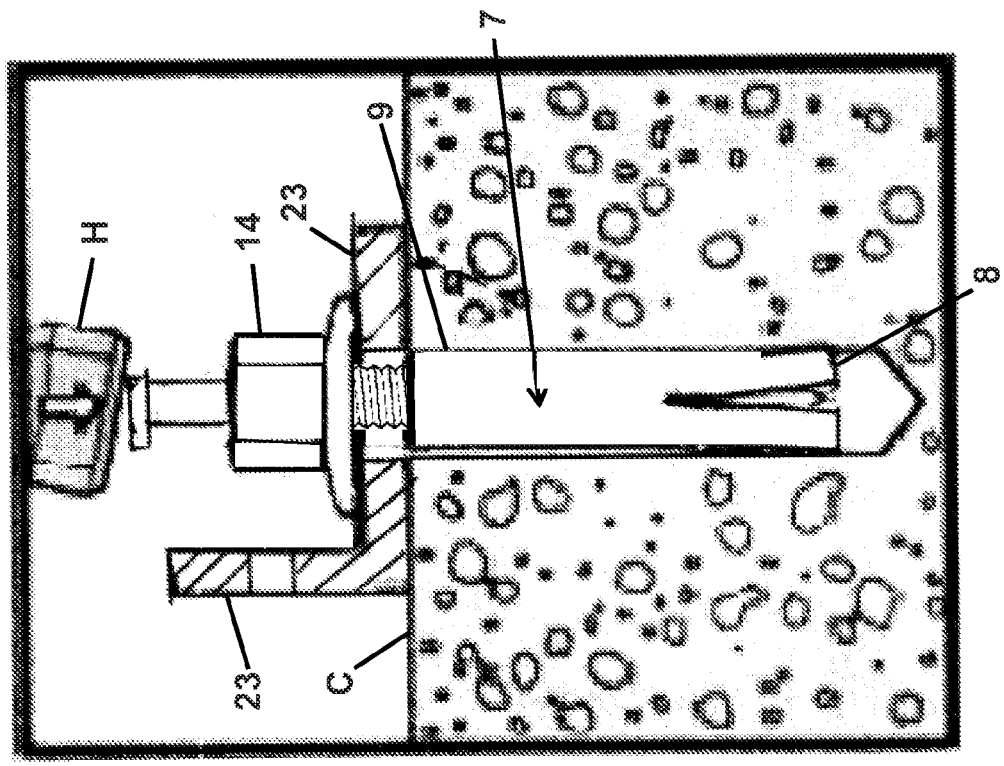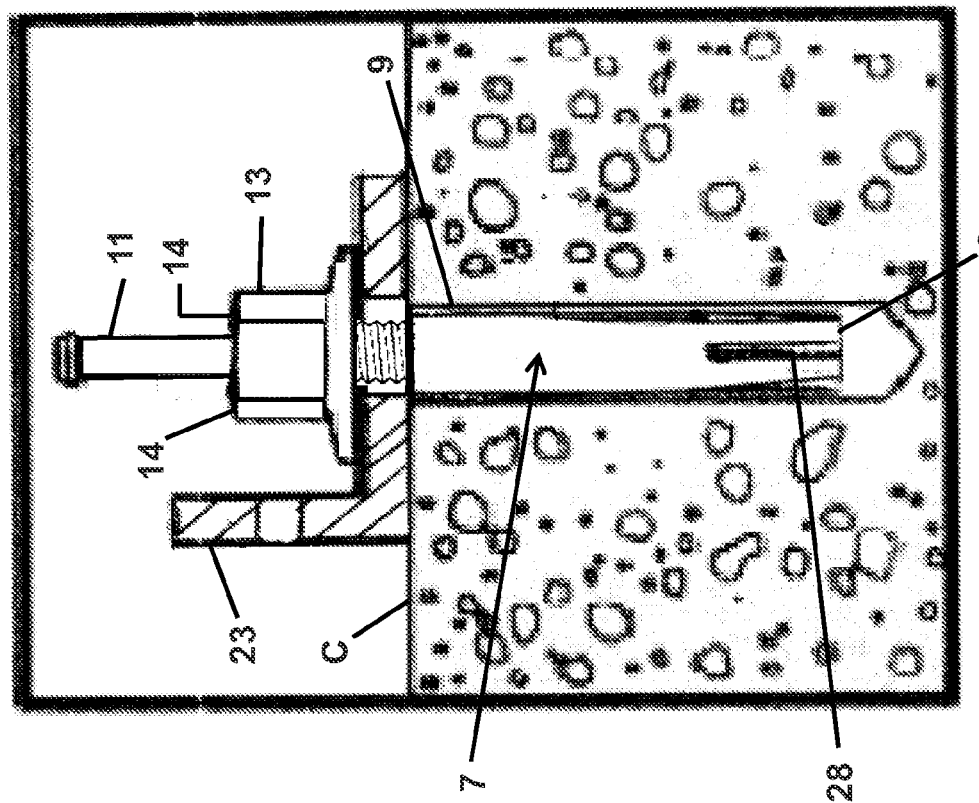

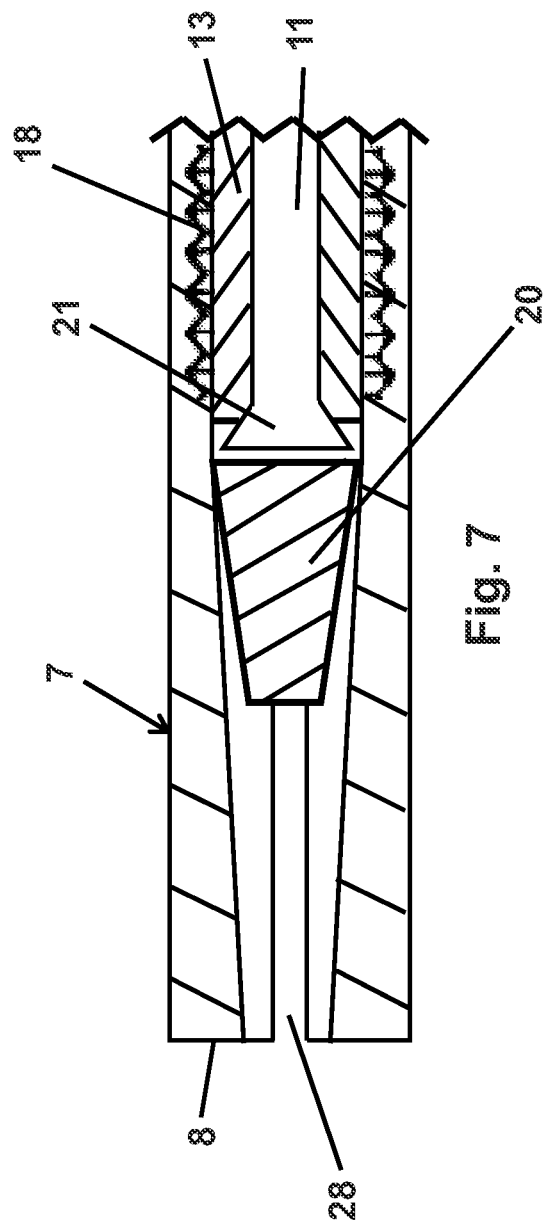

UNITARY, STRIKE, DROP-IN ANCHOR FOR CONCRETE AND THE LIKE

This application claims the benefit of priority pursuant to 35 U.S.C. 119(e) from a U.S. provisional patent application having Application No. 61/648,919 filed May 18, 2012.

BACKGROUND

Wedge, or strike anchors have been long and widely used for securing structural members to concrete, or to secure fixtures into concrete walls or floors. Conventionally, such anchors for concrete or brick and the like, are formed of an outer sleeve having a central bore, of a rigid and preferably hard material, formed so as to be flarable at the end intended to be held within the rigid, hard substrate. The sleeve has an internal bore and an end which can be flared and is either partially flared or has expansion slits extending axially outwardly from the inner end. The bore at the flarable inner end is generally smaller as compared to the remaining threaded bore, extending to the outer end of the sleeve. A slug is firmly positioned within the bore adjacent the expandable inner end, but not permanently attached to the inner walls of the bore. It is intended to be hammered inwardly so as to be movable into the expandable inner end portion, causing it to expand and flare radially outwardly. When the inner end expands, the anchor becomes permanently wedged within the concrete or brick substrate.

Generally, a striking tool is inserted into the bore after the anchor has been inserted into a previously formed hole into the concrete or brick, with a portion extending outside of the bore which is intended to be struck by a hammer or a power tool to force the slug into the expandable portion and, thus, to expand the anchor into a wedge shape that will secure the anchor in the concrete or brick material.

These wedge anchors or expansion anchors are generally secured into a hard surface such as concrete or brick using a mechanical self-wedging effect formed at the inner end of the fastener. Specifically, hammering drives an internal slug against the internally narrower portion of the anchor slot, causing the inner end of the anchor to spread and become wedged in the hole in the concrete or brick.

Previously the setting of the anchor device and wedging into the, e.g., concrete, required a separate hammer and driving tool, to move the slug internally wedged in the channel within the anchor. Such a system requires having available a strike or driving tool having the proper diameter to fit within the anchor bore and to be strong enough to hammer the wedge to flare the inner end of the anchor.

GENERAL SCOPE OF THE INVENTION

In accordance with the present invention, the driving tool, intended to be driven by a hammer or other heavy object, is locked within the anchor so that the worker does not have to search for a particular size drive tool for each anchor. The driving tool can further provide additional support for fixtures along with a bolted-on bracket held in place by the bolt head to the anchor. The assembled unitary anchor of the present invention comprises an anchor sleeve, having a central bore; a wedge slug held within the anchor bore. The end of the anchor intended to be initially inserted into a performed hole, the inner end, preferably is convergent to a smaller end diameter which is expandable when the wedge slug is pushed inwardly by the hammered driving tool. A central bore through the anchor also converges at the inner end, and preferably is internally threaded at the larger, constant diameter, outer end of the bore. A strike tool is placed within the sleeve bore so that an inner end is located adjacent to the wedge slug, and the shaft extends beyond the outer end of the sleeve. The inner end of the strike tool is enlarged relative to the shaft. A bolt having a driving head and a threaded shaft is threadedly connected into the threaded end of the anchor, and the shaft of the strike tool is positioned to extend out beyond the anchor, through a central bore through the bolt, the central bore through the bolt being too small in diameter to allow the expanded inner end of the strike tool to pass, thus locking in the strike tool within the anchor bore, when the bolt is threadedly connected in the anchor bore.

The flarable, anchor sleeve inner end, preferably has expansion slits extending axially along the sleeve, preferably extending up to the constant diameter, internally threaded portion of the anchor. The bore at the flarable inner end is generally smaller and unthreaded, as compared to the remaining threaded bore, extending to the outer end of the sleeve. A slug is firmly positioned within the bore adjacent the expandable inner end, but not permanently attached to the inner walls of the bore. It is intended to be hammered inwardly so as to be movable into the expandable inner end portion, causing it to expand and flare radially, outwardly. When the inner end expands, the anchor becomes permanently wedged within the concrete or brick substrate.

Structural or fixture supporting members can be secured to the anchor by way of the bolt threadedly connected into the threaded portion of the sleeve and extending outwardly therefrom.

Generally, the opening into the concrete surface is formed by drilling or tapping out previously formed concrete material, although, of course, the concrete can be formed with that hole, e.g., when cast. The opening into the hole should be just slightly larger than the main body of the anchor material prior to the expansion of the inner end, so as to snugly fit the main body. Generally the anchor is pushed or hammered into the hole in the concrete or brick until the outer end of the anchor sleeve is generally flush with the surface of the (e.g., brick or concrete) material into which it is to be anchored.

The anchor of this invention is permanently provided with the strike tool.

GENERAL DESCRIPTION OF THE DRAWINGS

Exemplary embodiments of the present invention, which clearly show the features and advantages of the invention, are shown in the following accompanying drawings, taken together with the detailed description below:

FIG. 2 shows a side view of the threaded bolt for threaded insertion into the anchor sleeve, including the driving strike tool of the present invention extending therethrough;

FIG. 2a is a detailed, expanded cross-sectional view, showing the threaded end of the bolt of FIG. 2, and the locking, peened, end of the strike tool of the present invention;

FIG. 3 is an end view, from the threaded end of the bolt and strike tool of FIG. 2;

FIG. 4 is an end view from the threaded end of the bolt of FIG. 2;

FIG. 5 is a partially cut-away, diagrammatic view showing an expandable concrete anchor of this invention, fully assembled within a hole formed in concrete, including an optional bracket exemplifying one way of attaching a fixture to the concrete wall;

FIG. 6 is the same expandable anchor of FIG. 5 wherein the inner end has been expanded by hammering, including an optional bracket exemplifying one way of attaching a fixture to the concrete wall; and FIG. 7 is a detailed, expanded cross-sectional view of the expandable end of the fully assembled drop-in expandable anchor, used for concrete or brick.

DETAILED DESCRIPTION OF THE PREFERRED EMBODIMENT

Figure 1:
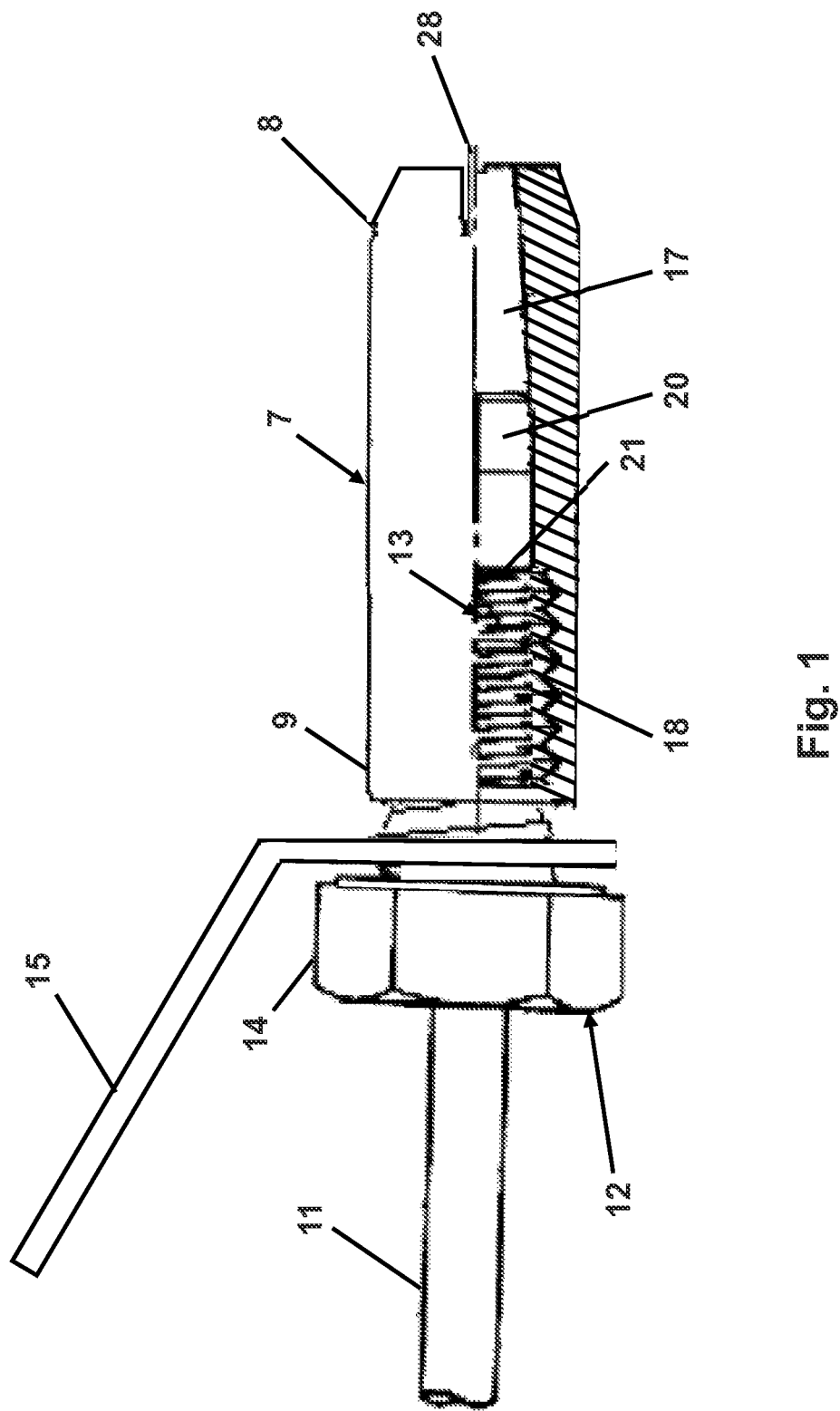
FIG. 1 is a partially cut-away view of a fully assembled unitary, strike, drop-anchor of this invention, including an optional bracket exemplifying one way of attaching a fixture to a concrete surface.

The threaded, expandable concrete anchor device of the present invention is shown in its fully assembled form in FIG. 1. The driving tool 11 is shown in place and locked into the drop-in anchor so that it cannot inadvertently drop out from the completed combination. In this manner, when such a system is purchased, there is no need to find a properly sized driving tool as it is intrinsically found in place. Although, as shown, the driving tool 11 has a straight shaft, the extending outer end portion 21 can include some type of a support in addition to the bracket 15 bolted to the anchor.

The anchor sleeve indicated generally as numeral 7, includes an external body, generally externally smooth in nature, with a bore, which extends through the anchor sleeve 7, preferably with an opening on both ends of the anchor sleeve; one end of the bore is internally threaded 18. In addition, there are slots 28 formed through the wall of the anchor extending into the narrower end of the inner bore 17 to provide the necessary expandability when inserted into a concrete wall.

The internally threaded portion 18 of the inner bore, extends from the wider, outer end down to the location of an internally wedged slug 20 located in the bore, inwardly from the threaded portion 18 and immediately before that portion of the inner bore 17 that has a smaller diameter than the threaded portion. The slug 20 preferably has a chamfered, or convergent, end portion to ease its movement into the narrow bore portion 17.

As shown in FIG. 1, the preferred fully assembled anchor assembly shows the drop-in anchor body 7 having a narrowed inner end 8 and at the wider outer end 9 the interior bore 18 is threaded. An externally threaded hollow bolt 12 connects an angle bracket 15, 15A to the anchor 7, passing through an opening 25 in the bracket 15, and the combination of the bolt and bracket are threadedly connected into the bore of the drop-in anchor 7. The bore 16 through the center of the bolt 12 has the strike tool 11 extending therethrough and out the inner threaded end 13 of the bolt; the strike tool 11 has an expanded, or peened, end 21. The peened end 21 has a diameter larger than the interior channel 16 of the bolt 12, such that when the bolt 12 is threadedly connected into the anchor 7, the strike tool 11 cannot be removed.

Inside the bore 17, 18 of the drop-in anchor sleeve 7, immediately adjacent the narrowed portion of the internal bore 17, is the hammer slug 20. This hammer slug 20 is preferably wedged in place, but may be held in place when the strike tool 11 and the bolt 12 are threadably connected into the anchor.

When assembling the anchor assembly, the slug 20 is wedged into the interior channel, extending into the beginning of the narrowing channel 17, by virtue of the narrowing end of the slug 20, as shown in FIG. 7, and the strike tool 11 is placed into the bore 17 of the bolt 12 from the threaded inner end, such that the peened end 21 of the strike tool 11 rests against the inner end 13 of the bolt. As shown in FIG. 2A detail, the inner end opening 13 into the bolt channel can be inset 13A, so as to form a contoured surface for the peened end 21 of the strike tool 11.

The bracket 15 shown in the drawing of FIG. 1 is angled and normally that angle will extend in the direction away from the concrete surface C. A perpendicular bracket 15 is shown in FIGS. 5 and 6, where the long leg of the bracket 15 extends away from the concrete surface C, as shown.

In FIG. 2, the bolt 12 is shown as having a polygonal cross-section head 14, in this example a generally hexagonal head 14, and a threaded barrel 13. A bore 16 is drilled or formed, generally centrally located, through the head 14 and through the barrel 13 to the threaded end 13A. The expanded end of the strike tool 11 is inserted with the outer end into the threaded, inner end 13 of the bolt, and extends outwardly through the bolt head 14, as shown in the drawing. When the bolt is combined with the bracket and threadedly connected into the anchor sleeve 7, neither the bracket 15, 23 nor the strike tool 11, can be lost.

In use, a hole is formed in the concrete as by a mechanical drill and the narrower end 8 of the anchor is inserted therein as shown in FIG. 5, the anchor 7 is preferably fully within the bore. The end of the strike tool 11 protrudes beyond the end of the threaded bolt 12 and preferably the anchor 7 extends sufficiently into the hole that at least the entire internally threaded portion of the anchor is wholly within the hole in the concrete, and most preferably the entire length of the anchor. Depending upon the depth of that hole, the anchor should extend at least fully into the hole or even below the top of the hole, but the threaded bolt can be screwed down so that the head 14 of the bolt it is firmly secured to the upper surface of the concrete. As shown in FIGS. 5 and 6, where a bracket is connected between the bolt head and the concrete, that bracket should be lying flush against the concrete surface in the preferred embodiments.

Referring to FIG. 7, the location of the slug 20 is shown, located immediately inward of the threaded portion 18 of the anchor bore, and just extending into the narrowing portion 17, at its inner end. As shown in FIGS. 5 and 6, the anchor with the bolt in place securing the perpendicular bracket 23 is inserted into the concrete with the strike tool 11 extending beyond the bolt head 14. When the anchor is set in place, the outer end of the rod 11 can be struck with, for example, a hammer H, which causes the slug to be struck and moved inwardly so that it expands the internal channel to meet the dimensions of the slug; thus flaring the inner end 8, and thus causing the anchor sleeve 7 to become firmly wedged within the hole in the concrete surface.

In other embodiments of the invention, the outer end of the strike rod 11 can, itself, provide a support for some other structural member or figure to be positioned and secured to the concrete surface. The concrete surface can be a horizontal floor, a horizontal ceding or a vertically oriented wall. The particular bracket or other support to be secured to the bolt is determined, of course, by the nature and orientation of the surface and of the item to be supported.

The present invention is intended to be defined by the following claims. The particular embodiments as set forth herein are merely exemplary of the full scope of this invention, which is to be determined in accordance with the language of the claims. Only the claims may determine the scope and spirit of the invention.

What is claimed is:

1. A unitary strike, drop-in anchor comprising: an anchor body, having a centrally located bore; the bore having an internally threaded portion at an outer end, the threaded portion having a substantially constant internal diameter, and an inner end portion having a narrower internal diameter and which is flarable;

a slug held within the anchor body bore, adjacent the narrower internal diameter;

a bolt having a driving head and a threaded shaft, threadedly connected into the threaded portion of the anchor body, and a centrally located bolt bore through the bolt driving head and shaft;

a strike tool, comprising an externally extending shaft and an inner expanded end; the expanded end being located within the anchor body bore adjacent the slug, and the shaft extending outwardly from the expanded end through the bolt bore and out of the bolt head; the strike tool shaft intended to be driven by a hammer or other heavy object, and the inner expanded end of the strike tool being too large to pass through the bolt bore and is thus locked within the anchor bore when the bolt is threadedly connected into the anchor body;

whereby striking the outer end of the strike tool shaft when the anchor is inserted into concrete pushes the slug into the narrower portion of the anchor bore, causing the inner end of the anchor to expand and become wedged within the concrete.

2. The unitary strike, drop-in anchor of claim 1, wherein the portion of the anchor sleeve having a narrower internal diameter also has a narrower external diameter.

3. The unitary strike, drop-in anchor of claim 1, further comprising a bracket secured by the bolt to the anchor.

4. The unitary strike, drop-in anchor of claim 1, wherein the internal bore and the external diameter of the anchor sleeve are convergent to a narrowest diameter at the inner end.

5. The unitary strike, drop-in anchor of claim 1, wherein the slug is wedge shaped, where the narrower end faces towards the narrower end of the anchor body.

6. The unitary strike, drop-in anchor of claim 1, further comprising expansion slots extending through the anchor body, extending from a position axially inwardly beyond the internally threaded portion to the narrower inner end of the anchor body.

\* \* \* \* \*